(12) United States Patent
Rafeld

(10) Patent No.: US 10,106,019 B2
(45) Date of Patent: Oct. 23, 2018

(54) COLLAPSIBLE VEHICLE DOOR AND METHOD OF USE

(71) Applicant: BEACHCOMBER OFFROAD, LLC, N. Easton, MA (US)

(72) Inventor: James Matthew Rafeld, N. Easton, MA (US)

(73) Assignee: BEACHCOMBER OFFROAD, LLC, N. Easton, MA (US)

( * ) Notice: Subject to any disclaimer, the term of this patent is extended or adjusted under 35 U.S.C. 154(b) by 12 days.

(21) Appl. No.: 15/407,504

(22) Filed: Jan. 17, 2017

(65) Prior Publication Data

US 2017/0203640 A1  Jul. 20, 2017

Related U.S. Application Data

(60) Provisional application No. 62/278,702, filed on Jan. 14, 2016.

(51) Int. Cl.
| | |
|---|---|
| *B60J 5/06* | (2006.01) |
| *B60J 5/04* | (2006.01) |
| *E06B 3/06* | (2006.01) |
| *B60J 1/08* | (2006.01) |
| *B60J 10/86* | (2016.01) |
| *B60J 10/15* | (2016.01) |

(52) U.S. Cl.
CPC .............. *B60J 5/06* (2013.01); *B60J 5/0487* (2013.01); *E06B 3/06* (2013.01); *B60J 1/08* (2013.01); *B60J 5/0481* (2013.01); *B60J 5/0483* (2013.01); *B60J 10/15* (2016.02); *B60J 10/86* (2016.02)

(58) Field of Classification Search
CPC ... B60J 5/06; B60J 5/0487; B60J 10/15; B60J 10/86; B60J 1/08; B60J 5/0481; B60J 5/0483; E06B 3/06
See application file for complete search history.

(56) References Cited

U.S. PATENT DOCUMENTS

| | | | |
|---|---|---|---|
| 2,557,631 A * | 6/1951 | Callan ...................... | E04G 15/02 164/340 |
| 2,682,427 A | 6/1954 | Bright | |
| 4,070,056 A * | 1/1978 | Hickman ............... | B60J 5/0487 296/148 |
| 9,387,746 B2 * | 7/2016 | Rutland ................... | B60J 11/06 |
| 2005/0110298 A1 * | 5/2005 | Fin .......................... | B60J 5/0487 296/146.5 |
| 2016/0185192 A1 * | 6/2016 | Yamamoto ............. | B60J 5/0487 296/146.9 |
| 2017/0206806 A1 * | 7/2017 | Temple .................. | G09B 19/24 |

\* cited by examiner

*Primary Examiner* — Lori L Lyjak

(74) *Attorney, Agent, or Firm* — Zachary M. Thomas

(57) ABSTRACT

A collapsible vehicle door is provided that can be easily installed and uninstalled on a vehicle, without modification to the vehicle. The uninstalled door can be collapsed into a compact configuration allowing for storage within the vehicle. The collapsible door includes frame pieces that can be fixed together to form a frame. The frame pieces may be shaped to match or partially match the contour of the door frame of the vehicle on which the collapsible door is to be installed. A cover piece is attached to the frame to provide protection from exterior weather conditions and prevent unauthorized access to the vehicle cabin. A hinge portion of the collapsible door is configured to connect to the hinge portion on the stock vehicle body. A latch portion of the collapsible door may be used to secure the collapsible door in the closed portion.

20 Claims, 10 Drawing Sheets

COLLAPSIBLE VEHICLE DOOR AND METHOD OF USE

The present application claims priority under 35 U.S.C. § 119(e) to U.S. provisional patent application, U.S. Ser. No. 62/278,702, filed Jan. 14, 2016, which is herein incorporated by reference in its entirety.

BACKGROUND

Vehicle door removal is a common modification made by cabined vehicle operators to provide a more enjoyable riding experience, particularly in sporting utility vehicles (SUVs) such as the "Jeep Wrangler." This presents a problem, for example, during periods of inclement weather where the vehicle's cabin may become damaged or uncomfortable due to exposure to the elements. A collapsible vehicle door was proposed by Wilfred Bright in U.S. Pat. No. 2,682,427, (hereinafter Bright) to close the passenger compartment; it required a permanent modification to the vehicle itself.

SUMMARY

In view of the shortcomings of the prior art, the inventor(s) have recognized and appreciated the need for a vehicle door that can be easily stored within a vehicle when not installed. The inventor(s) have also appreciated the preference that providing such a door must not require any modification to the vehicle. A collapsible vehicle door is provided that can be easily installed and uninstalled on a vehicle, without modification to the vehicle. The uninstalled door can be collapsed into a compact configuration allowing for storage within the vehicle.

In one aspect the invention relates to a collapsible vehicle door for use with a vehicle. The collapsible vehicle door has a frame having a plurality of frame pieces, each frame piece having two end portions to connect to and disconnect from adjacent frame pieces among the plurality of frame pieces, the frame being formed by connecting the end portions of each of the plurality of frame pieces with its respective adjacent frame piece; a latch secured to one of the plurality of frame pieces; a hinge portion secured to one of the plurality of frame pieces; and a cover piece having fasteners to secure the cover piece about the frame.

In some embodiments, each of the plurality of frame pieces connects to exactly two other frame pieces.

In some embodiments, the frame has a single perimeter. The single perimeter of the frame may match a contour of a door frame of the vehicle. Each of the plurality of frame pieces may form a portion on the single perimeter.

In some embodiments, the hinge portion has a securing portion the secures the hinge portion to the frame; and a pin portion connected to the securing portion and configured to attach to a vehicle hinge portion of the vehicle. The securing portion may have a through hole for securing the pin portion, the through hole having a first side and a second side, both sides being configured to interchangeably receive the pin portion. The pin portion may be connected to the securing portion through the first side of the through hole.

In some embodiments, the hinge portion comprises a pin configured to be received by a vehicle hinge portion of the vehicle.

The hinge portion may have a pin configured to be received by a cylindrical receiving portion of the vehicle proximal to the door frame of the vehicle.

Another aspect relates to a method of replacing a stock vehicle door with a collapsible vehicle door on a stock vehicle. The method comprises disconnecting a hinge portion of the stock vehicle door from a hinge portion of the stock vehicle; and connecting a hinge portion of the collapsible vehicle door to a hinge portion of the stock vehicle.

In some embodiments the hinge portion of the collapsible vehicle door comprises a pin and the connecting comprises inserting the pin into the hinge portion of the stock vehicle.

In some embodiments, the method further comprises assembling the collapsible vehicle door by fixing a plurality of frame pieces together in the form of a frame for the collapsible vehicle door; and attaching a cover piece to the frame. Fixing the plurality of frame pieces may be achieved by inserting a male end of a first frame piece into a female end of a second frame piece and securing the connection with a latching push pin. The connection may be performed with an exterior latching push pin or an interior latching push pin. Fixing the plurality of frame pieces may comprise placing a connecting portion joining adjacent frame pieces into a locked position.

Yet another aspect relates to a vehicle having a vehicle body; a vehicle door frame; a vehicle hinge portion permanently connected to the vehicle body; and a collapsible vehicle door. The collapsible vehicle door has a plurality of frame pieces fixed together to form a frame of the collapsible vehicle door; a door hinge portion secured to the frame of the collapsible vehicle door hingedly connected to the vehicle hinge portion; and a cover piece secured about the frame of the collapsible vehicle door.

In some embodiments, the door hinge portion comprises a pin portion which is inserted into a cylindrical portion of the vehicle hinge portion.

In some embodiments, the at least two of the plurality of hinge pieces are fixed together using a pivot piece.

In some embodiments the door hinge portion has a securing portion the secures the door hinge portion to the frame; and a pin portion connected to the securing portion and configured to attach to the vehicle hinge portion of the vehicle, wherein the securing portion has a through hole for securing the pin portion, the through hole having a first side and a second side, both sides being configured to interchangeably receive the pin portion.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
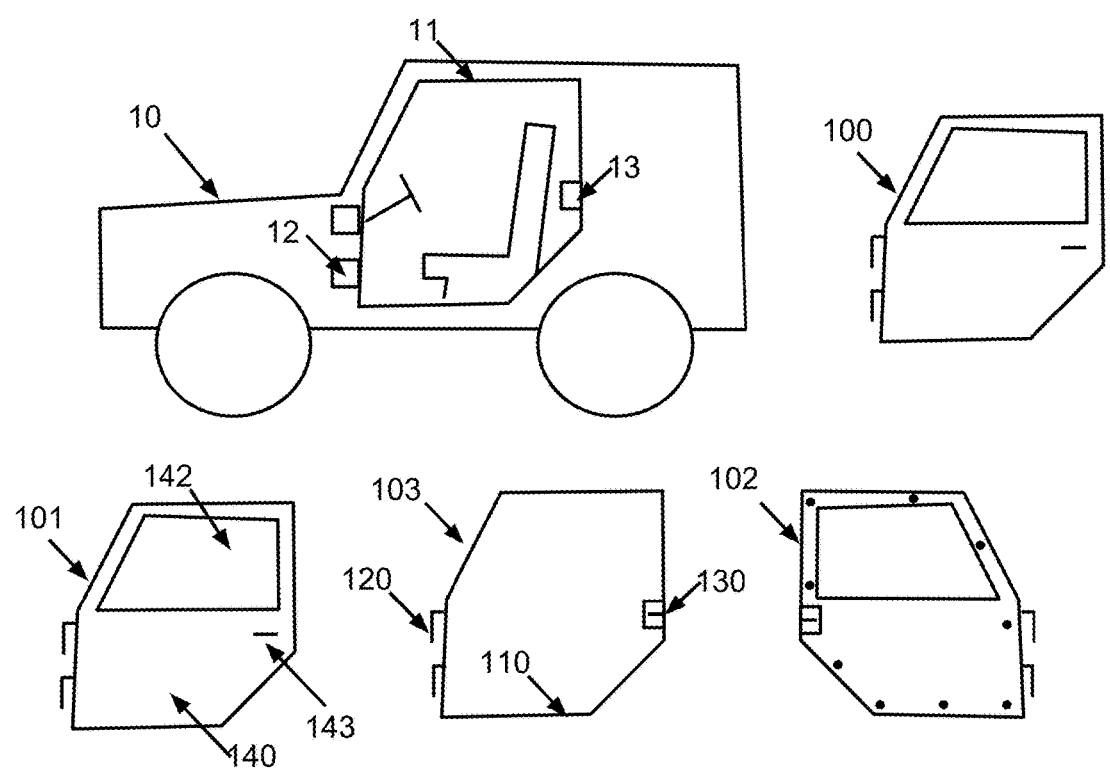
FIG. 1 shows a stock vehicle with its factory door removed and several views of a collapsible vehicle door according to some embodiments.

FIG. 1 shows a vehicle 10 with its factory issue ("stock") door removed. Also shown is collapsible vehicle door (CVD) 100 in accordance with some embodiments. CVD 100 is shown from the exterior view 101, interior view 102, and with the cover piece 140 removed (frame view 103). CVD 100 may include a frame 110, one or more hinge portions 120, a latch portion 130 and a cover piece 140. Frame 110 is constructed from a plurality of frame pieces that can be disassembled to permit CVD 100 to reach its collapsed configuration. The frame pieces are connected together into fixed positions to form frame 110. The frame pieces may include features at their ends to facilitate connecting the frame pieces into the fixed positions (e.g., in a male/female configuration) or separate connecting portions may be used to fix the frame pieces together. Hinge portion 120 hingedly connects CVD 100 to hinge portion 12 of the vehicle body and allows CVD 100 to open and close. Advantageously, hinge portion 120 may be configured to operate with the stock hinge portion 12 of vehicle 10 without modification to vehicle 10. Similarly, latch portion 130 may operate with latch portion 13 of vehicle 10 without modification to the vehicle. Cover piece 140 provides a fabric or other material cover over the surface of the frame. In some embodiments a window portion 142 is used to provide visibility to the driver of vehicle 10 when CVD 100 is in use.

Figure 2A:
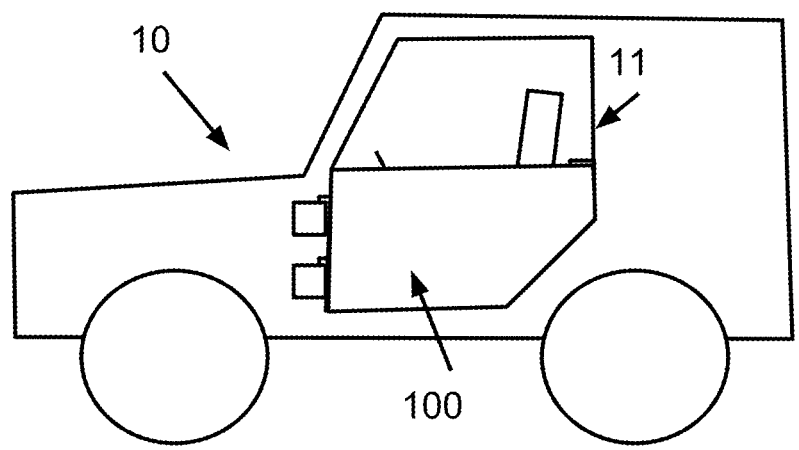
FIG. 2A shows a stock vehicle with a collapsible vehicle door according to some embodiments.
Figure 2B:
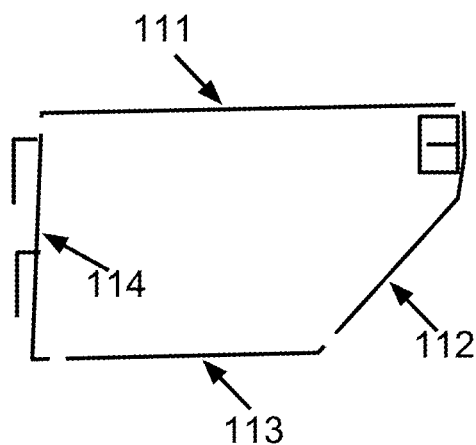
FIG. 2B shows frame pieces and other portions of a collapsible vehicle door according to some embodiments.

Frame 110 provides the structural support for CVD 100. Frame 110 may be customized both for the particular vehicle type that the door is intended for use with (e.g., 1997 Jeep Wrangler), and also for the particular door location on the vehicle (e.g., front left, front right). For example, the frame may be configured to follow the contour of the door frame of vehicle 10 (i.e., vehicle door frame 11). As shown in FIG. 2A, in some embodiments, CVD 100 only follows a portion of the contour of vehicle door frame 11 (e.g., a "half-door"). As shown in FIG. 2B, an exploded view of a half door frame 110, frame pieces 112-114 follow the contour of vehicle door frame 11, while frame piece 111 does not follow the vehicle door frame. It should be appreciated that any number of frame pieces may follow the contour of vehicle door frame 11. Likewise, any number of frame pieces may not follow the contour of vehicle door frame 11.

Figure 3A:
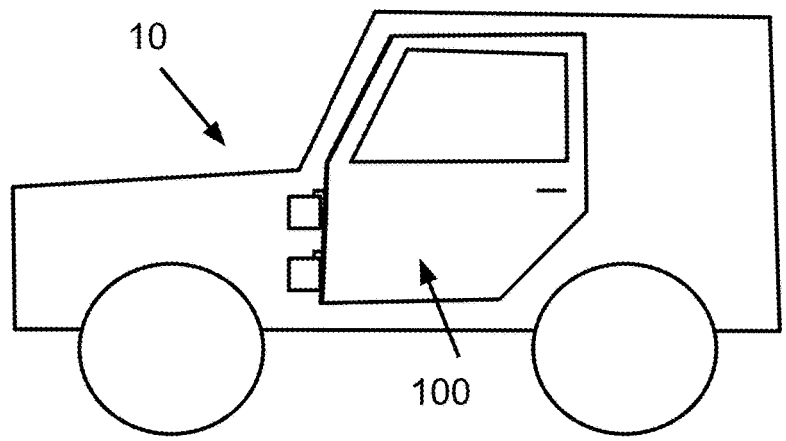
FIG. 3A shows a stock vehicle with a collapsible vehicle door according to some embodiments.
Figure 3B:
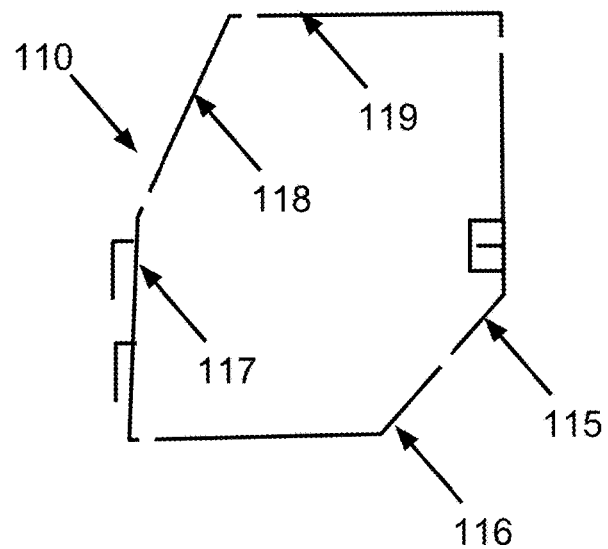
FIG. 3B shows frame pieces and other portions of a collapsible vehicle door according to some embodiments.

FIG. 3A shows CVD 100 hingedly attached to vehicle 10 and secured in the closed position by latch portions 130 and 13 (occluded from view). FIG. 3B shows an exploded view of an embodiment where frame 110 is made up of five frame pieces, namely, frame pieces 115-119. In other embodiments, frame 110 may have any suitable number for frame pieces, for example, 2, 3, 4, 5, 6 or more frame pieces. As shown, frame 110 may form a perimeter about the contour of vehicle door frame 11 without any interior crossing pieces. Advantageously a lighter CVD may be achieved if crossing pieces are excluded from frame 110. In other embodiments crossing pieces may be used to provide further structural support.

Frame 110 made be made of any suitable material. For example, in some embodiments, aluminium tubing of 0.5, 0.75, or 1 inch diameter may be cut and bent to the appropriate shape to follow the contour of vehicle door frame 11 of vehicle 10. The contour of vehicle door frame 11 may be determined from specifications provided by the manufacturer or may be measured in any suitable way. Computer control, customized tooling, and other methods may be used to shape raw material into the frame pieces of frame 110. Other suitable materials such as plastics, metals (e.g., titanium), carbon fiber composites, and the like may be shaped in any suitable way to form frame 110 of CVD 100. Multiple materials, may be used in some embodiments. For example, different materials may be used for different frame pieces of frame 110. In some embodiments frame 110 may be shaped at points along its perimeter that follow the contour of vehicle door frame 11 to provide a close seal. Such a seal may assist in preventing, wind, rain, and other exterior conditions from significantly affecting the cabin conditions within vehicle 10.

Figure 4A:
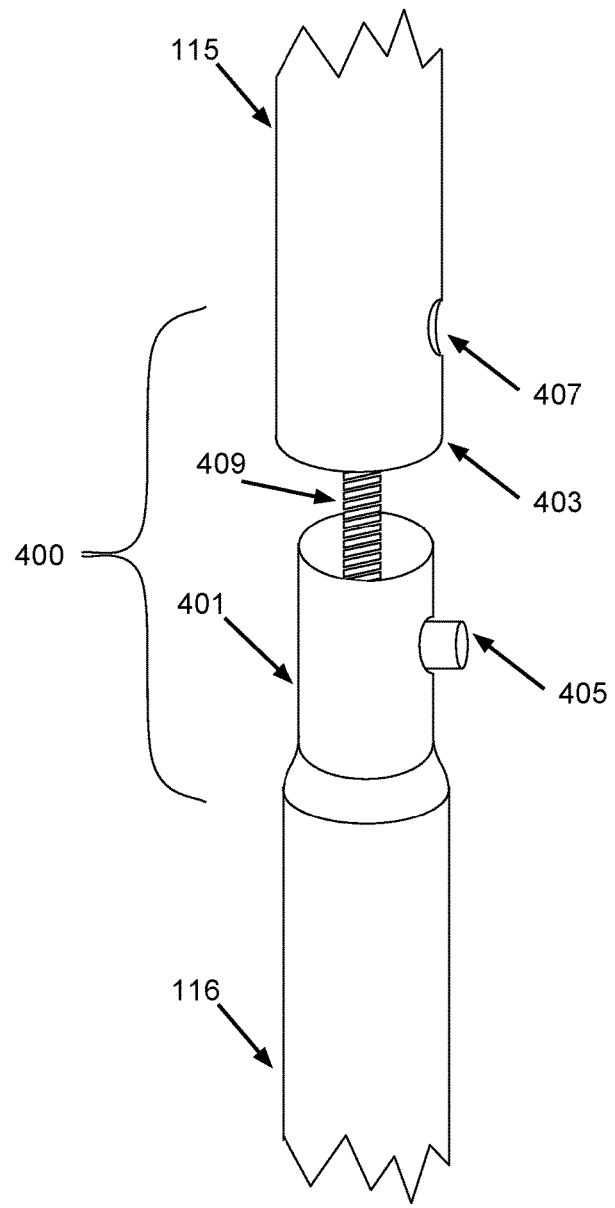
FIGS. 4A-4D shows connecting of frame pieces according to some embodiments.
Figure 4B:
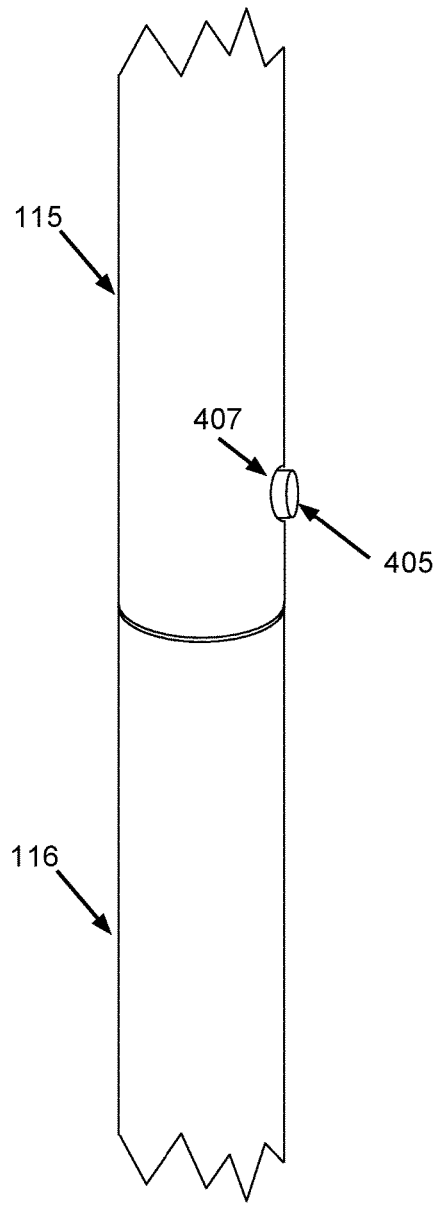
Figure 4C:
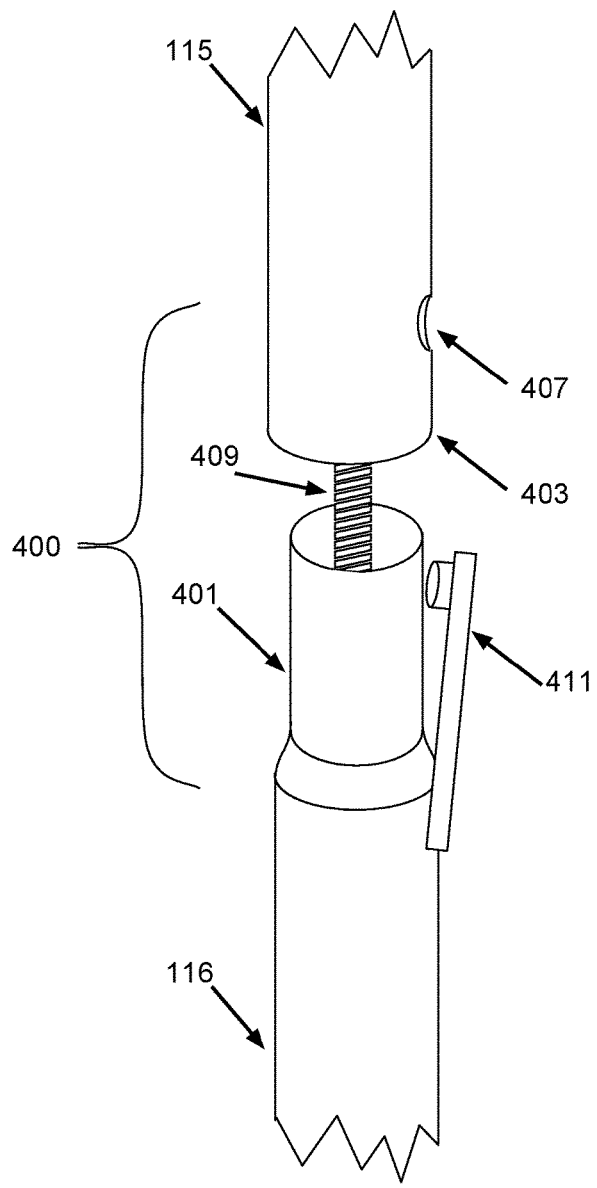
Figure 4D:
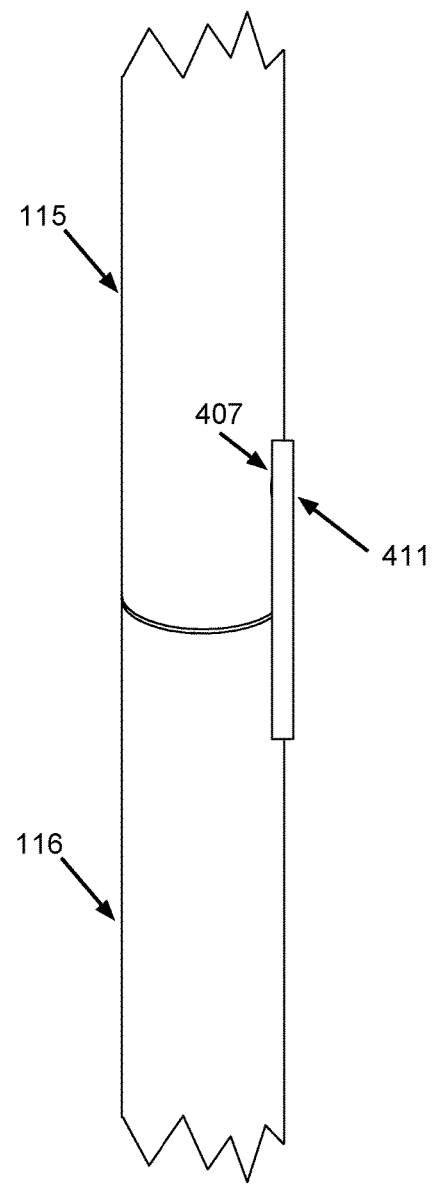

The frame pieces may connect together to form frame 110 in any suitable way. For example, as shown in FIG. 4A, frame pieces may have male and female ends that are mated with the adjacent frame piece. Specifically, in the example shown in FIG. 4A, connection portions 400 of frame pieces 115 and 116 are a female end 403 and a male end 401, respectively. Male end 401 may mate with female end 403 as shown in FIG. 4B. In some embodiments latching push pins 405 are used, similar to those of some tent poles or snap buttons, to further fix the frame pieces in position. When mated, latching push pin 405 extends through hole 407 as shown in FIGS. 4A-4B. In another embodiment, shown in FIGS. 4C-4D, external latching pins 411 are used. In yet another embodiment, the frame pieces 115 and 116 are secured by a nut and bolt (e.g., instead of a push pin). In one embodiment a flat-head, square-neck bolt passes perpendicularly through aligned holes in the mated male and female ends and the bolt is secured with a wing-nut. Other fastening methods include hook-and-loop fasteners, hook-and-pile fasteners, and touch fasteners. It should be appreciated that any suitable fastening solution may be used to fix the frame pieces in the shape of frame 110.

In some embodiments, the frame pieces (or a subset thereof) are hollow, and have a cord 409, as shown in FIGS. 4A-4D, that runs within the frame pieces, thus keeping mating ends of the adjacent frame pieces in order, while still allowing the frame to reach its collapsed state. Cord 409 may stretch to further facilitate connecting and disconnecting the frame pieces from one another. Any suitable elastic material may be used for cord 409.

In some embodiments the connecting pieces that connect the frame pieces are a pivot type piece. The pivot pieces are used to connect the frame pieces and allow the frame pieces to articulate into the shape of the frame or or into the collapsed state. Each pivot piece enables a hinging action allowing the frame pieces to articulate between the assembled and collapsed configuration. For example, the hinge of the pivot piece may be a ball bearing, male/female pivot, pinned or any other suitable configuration.

The pivot pieces may be formed in any suitable way. For example, each pivot piece may comprise a male piece and a female piece which connect to respective frame pieces and, pivotally, to one another allowing the desired hinging action. In some embodiments, the ends of the pivot pieces slide into hollow ends of the frame pieces and are secured in place (e.g., via an adhesive, pin, clip, or any other suitable way). In another embodiment the pivot pieces are integral end portions of the frame pieces.

In some embodiments one or more of the pivot pieces may "open" to permit the respective ends of the frame pieces to separate. In another embodiment, the frame is allowed to collapse without such opening, but by simply pivoting the pieces with respect to one another at the hinges of the pivot pieces.

In some embodiments, the resistance (friction) of the hinge action of the pivot pieces varies with position. For example, the resistance may increase when the pivot piece is fixed in the assembled door position so as to prevent the frame pieces from inadvertently collapsing.

Turning back to FIG. 1, in some embodiments the CVD 100 includes hinge portion 120 for hingedly connecting CVD 100 to vehicle hinge portion 12. Hinge portion 120 may be adapted in any suitable way for compatibility with the existing hinge portion 12 located on vehicle door frame 11. Hinge portion 120 may be connected to a suitable location on the frame 110 to ensure CVD 100 will conform with the contour of the vehicle door frame when hinge portion 120 is connected to vehicle door frame 11 and CVD 100 is in the closed position. Hinge portion 120 of CVD 100 may in fact only be a portion of a hinge as dictated by the model of vehicle 10 to which the collapsible door is to be used.

In one embodiment, hinge portion 120 may comprise hollow cylindrical portion(s) for receiving a pin when aligned with complimentary hollow cylindrical portion(s) of hinge portion 12. FIG. 5E shows one such embodiment of hinge portion 120. Specifically, FIG. 5E has a cylindrical connecting portion 527 through which a frame piece is inserted and secured. Additionally hollow cylindrical portions 523 and 525 are adapted to receive a hinge pin and hingedly secure CVD 100 to vehicle 10 when hinge portion 12 of the vehicle (also a hollow cylindrical portion) is placed between hollow cylindrical portions 523 and 525.

In another embodiment hinge portion 120 may comprise a pin that is inserted into a socket of hinge portion 12; one such embodiment is discussed in connection with FIGS. 6A and 6B, below. Alternatively, hingle portion 120 may comprise a socket which is seated over a pin of hinge portion 12. In yet another embodiment, the hinge portion 120 is a full hinge with a free connection plate for connection to vehicle door frame 11.

Figure 6A:
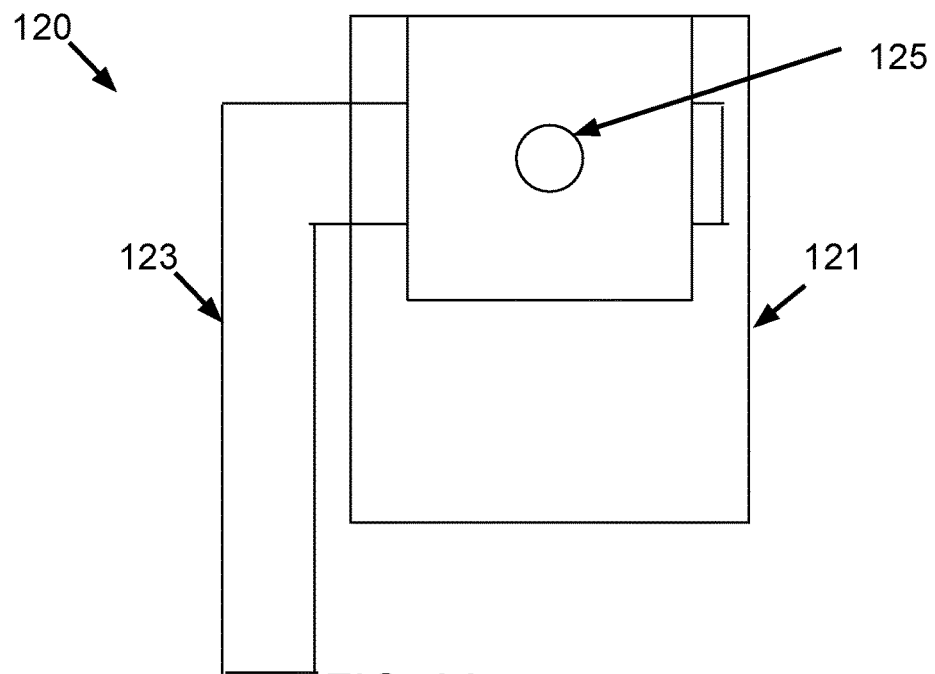
FIG. 6A-B show details of a hinge portion of a collapsible vehicle door according to some embodiments.
Figure 6B:
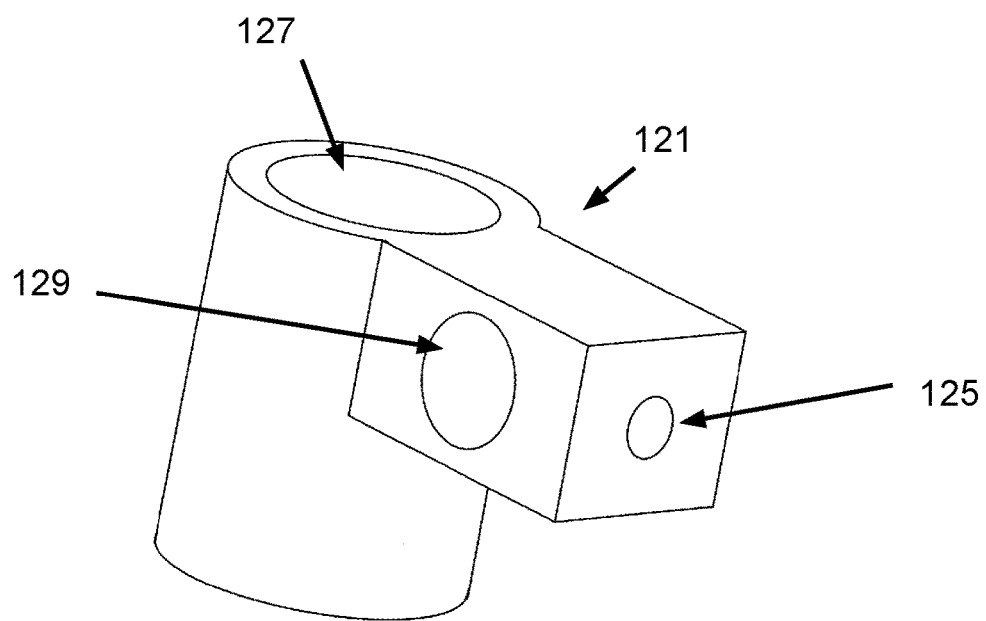

FIG. 6A and 6B show an embodiment of hinge portion 120 comprising a securing portion 121 and a pin portion 123 that may be inserted into a socket of hinge portion 12. Securing portion 121 has a socket 127 for securing hinge portion 120 to frame 110. For example, in one embodiment a frame piece of frame 110 passes through socket 127 and is secured in position. Securing portion 121 has a hole 129 through which an end of pin portion 123 passes through. Pin portion 123 may have an "L" shape to facilitate insertion into hole 129 while also presenting a pin end for insertion into hinge portion 12 of vehicle 10. Advantageously, securing portion 121 and pin portion 123 can be used for either right or left sided doors. Pin portion 123 is simply inserted into the opposite side of hole 129 to switch which side door hinge 120 is configured for. Finally, securing portion 121 may have a securing device 125 for securing pin portion 123 in position. Securing device 125 may be, for example, a set screw that screws into a threaded hole of frame securing portion 121. In other embodiments pin portion 123 is secured to securing portion 121 in another suitable way. For example, an adhesive may be used or pin portion 123 and hole 129 may be threaded.

In some embodiments CVD 100 includes a latch portion 130 for securing CVD in a closed position. Latch portion 130 is connected to the door frame 110 at a location such that when the collapsible door conforms to vehicle door frame 11, latch portion 130 is aligned with a corresponding latch portion 13 of the vehicle door frame 11. Latch portion 130 may be engaged with latch portion 13 of vehicle door frame 11 to secure CVD 100 in the closed position. Latch portion 130 may comprise only of that portion of the latch necessary to achieve closure with latch portion 13 of the vehicle door frame 11. Latch portion 130 may include one or more handles for securing and releasing the latching mechanism with latch portion 13. In one embodiment a single handle is used. Such a handle may be reached from the exterior through a slit in cover piece 140, for example. In another embodiment a handle of latch portion 130 extends through cover piece 140 for easy use from outside the vehicle. A lock may included with latch 130 to prevent unauthorized opening CVD 100. FIG. 5D shows a detail of latch portion 130 according to some embodiments.

CVD 100 may have a cover piece 140 that covers frame 110. In some embodiments cover piece 140 is a weatherproof, flexible material (e.g., canvas) that is secured to frame 110. The covering may be secured to the frame by a zipper, buttons, clips, or in any suitable way. The covering may have a transparent window area 142. Though in some embodiments, covering piece 140 itself is transparent or semi-transparent. A slit 143 in cover piece 140 may allow for exterior operation of latch 130. For example, the user may user her hand to release latch 130 from latch 12 through slit 143. Alternatively, a portion of latch 130 may extend through slit 143 to facilitate operation of the latch. Cover pieces with different features (e.g., material weight, transparency, designs) may be easily attached and removed from the frame such that a user may interchange a collection of cover pieces so that the cover piece display is most suitable at a particular time.

In some embodiments cover piece 140 includes sealant strips to reduce the possibility of exterior conditions affecting the vehicle cabin conditions. The sealant strips may be positioned at locations where CVD 100 matches the contour of vehicle door frame 11. Accordingly, when the CVD 100 is closed and the latch portions 130 and 13 are secured together, interior conditions are insulated from the exterior conditions of vehicle 10.

The sealant strips may be made of rubber or other suitable material to provide an airtight or watertight seal. Where an airtight seal is not practical or desired sealant strips may be used to reduce airflow in and out of the vehicle cabin. Where an watertight seal is not practical or desired sealant strips may be used to reduce waterflow in and out of the vehicle cabin.

FIGS. 5A-E show an embodiment of some components of CVD 100 that are configured to conform to a "TJ" version of the Jeep Wrangler product. The TJ configuration was used in model years 1997-2006. It should be appreciated that detailed drawings are provided to illustrate some embodiments. Other embodiments include configurations for the JK, JKU, and CJ versions of the Jeep Wrangler, or any other vehicle having vehicle doors removable by the end user.

Figure 5A:
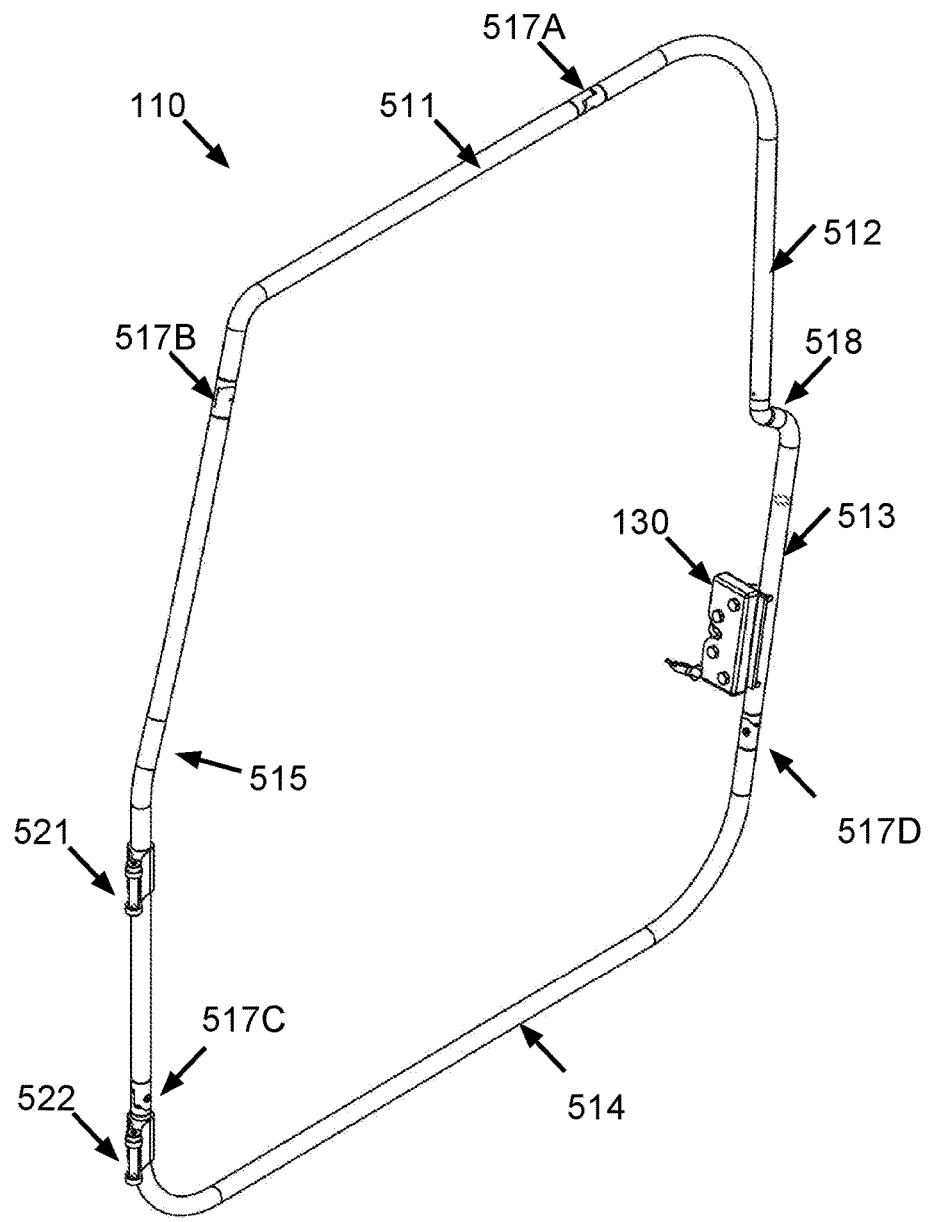
FIG. 5A shows frame pieces and other portions of a collapsible vehicle door according to some embodiments.
Figure 5C:
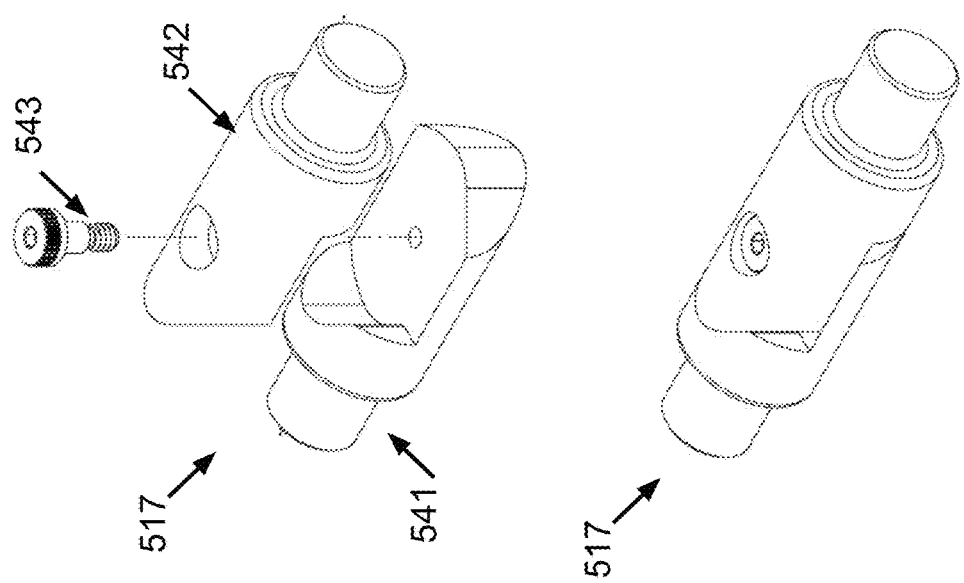
FIG. 5B-C show detail of connecting portions of a collapsible vehicle door according to some embodiments.
Figure 5B:
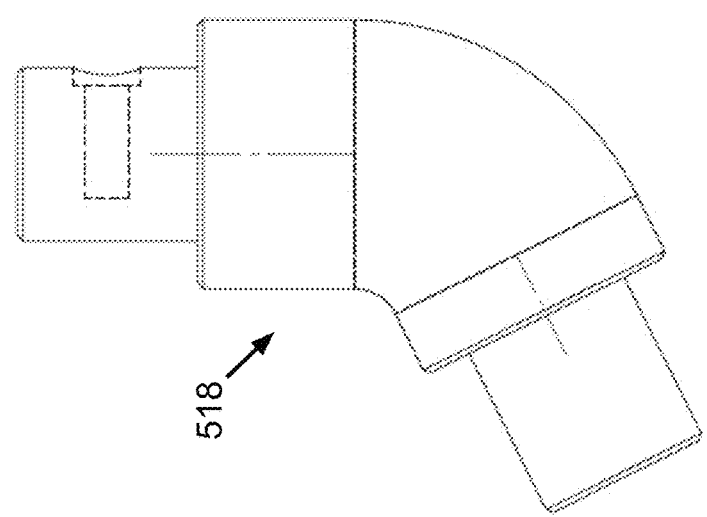
Figure 5E:
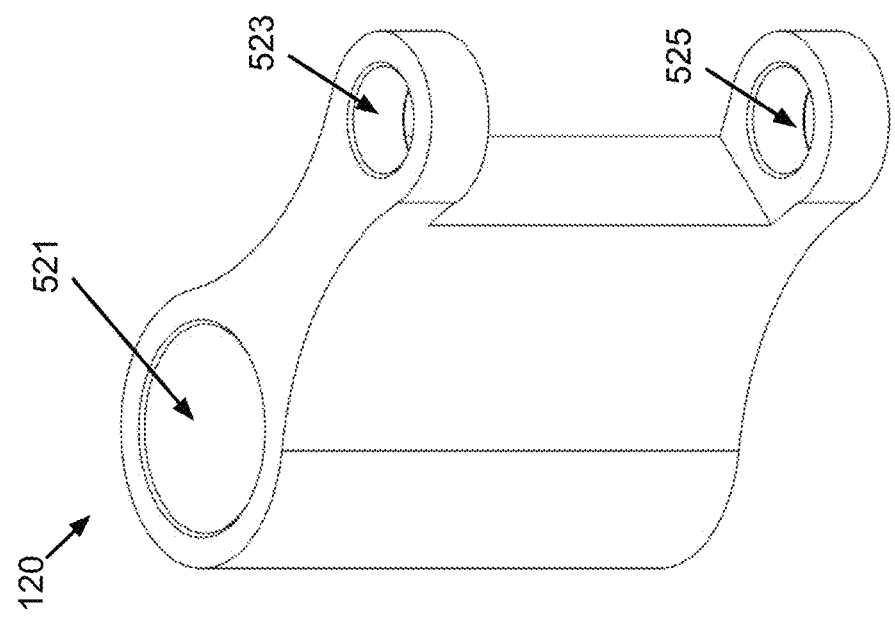
FIG. 5E shows detail of a hinge portion of a collapsible vehicle door according to some embodiments.
Figure 5D:
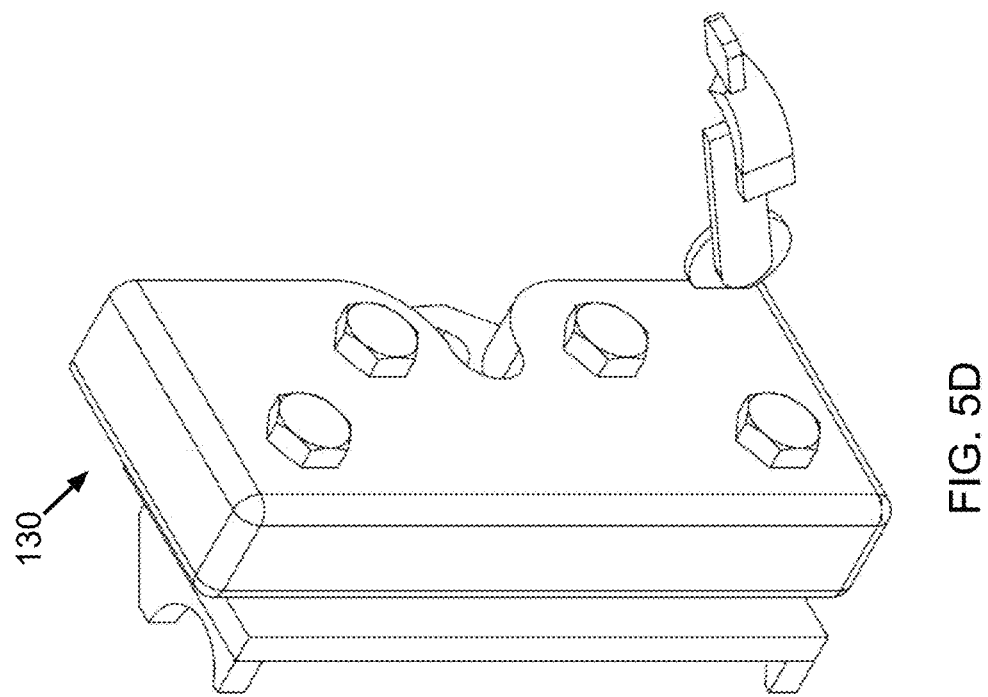
FIG. 5D shows a detail of a latch portion of a collapsible vehicle door according to some embodiments.

FIG. 5A shows frame 110 according to some embodiments. Frame 510 includes frame pieces 511-515 with connecting portions 517A-D an 518, a latch 130, and hinge portions 521 and 522. FIG. 5B shows a detail of connecting portion 518 according to some embodiments. The ends of connecting portion 518 are configured to firmly fit in the ends of frame pieces 512 and 513. A screw may be used to secure an end of connecting portion 518 to one or both of the frame pieces. FIG. 5C shows connecting portion 517 which may be used for frame pieces 517A-D in FIG. 5A. Connecting portion 517 includes two connecting swivel pieces 541 and 542 which may be connected by a fastener 543. Swivel pieces 541 and 542 may be configured such that when they are connected into connecting portion 517 they offer substantial resistance in a locked position (shown in FIG. 5C, lower) but swivel freely once released from the lock position. FIG. 5D shows a detail of latch portion 130 according to some embodiments. FIG. 5E shows a detail of a hinge portion 120 according to some embodiments (e.g., hinge portions 521 and 522 in FIG. 5A).

Figure 7:
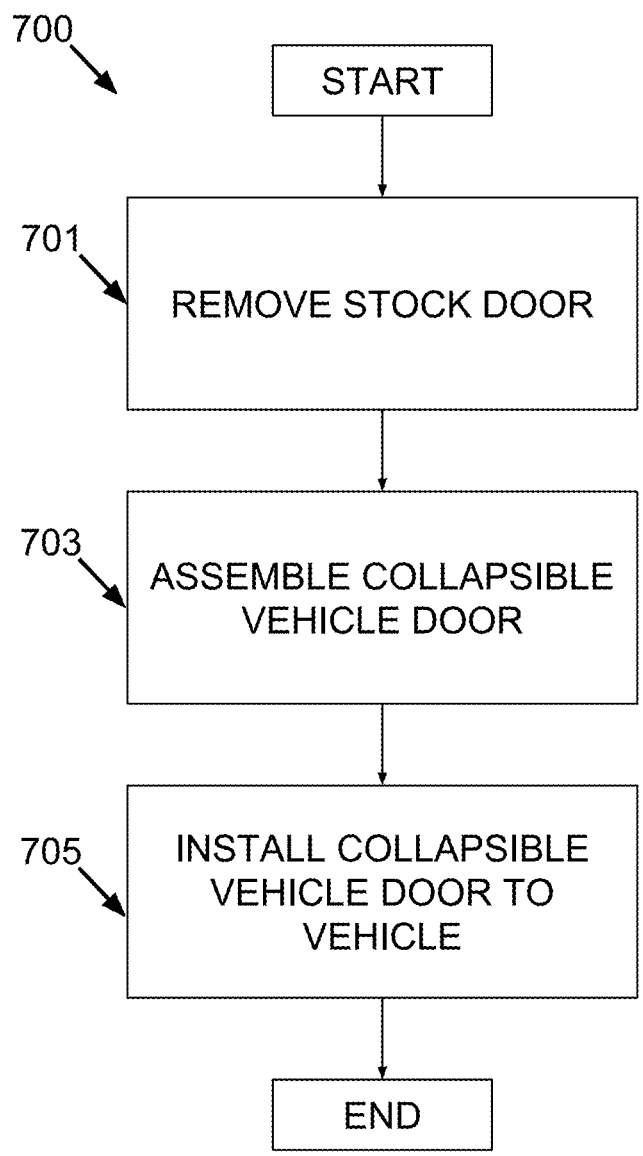
FIG. 7 shows a flow diagram of a method of replacing a stock vehicle door with a collapsible vehicle door on a stock vehicle according to some embodiments.

Turning now to FIG. 7, a method 700 is described for replacing a stock vehicle door with a collapsible vehicle door on a stock vehicle. It should be appreciated that the order of the acts in method 700 are exemplary and other orders may be used. For example, the collapsible vehicle door At step 701 the the stock door is removed from the vehicle (e.g., vehicle 10, FIG. 1). The stock door may be removed in any suitable way. For example, the user may remove any hinge pins holding the door in place, disengage the latching mechanism and lift the door out of the door frame.

At step 703 the user assembles a collapsible vehicle door such as CVD 100 shown in FIG. 1. The frame pieces may be assembled to form a frame for the CVD. The frame pieces may be connected in accordance with their design. For example, the frame pieces may be joined by inserting a male end of one frame piece into a female end of an adjacent frame piece; a push pin may be latched to secure the connection. In another embodiment the frame pieces are unfolded via the pivot pieces to form the frame.

With the frame assembled the cover piece may be attached over the frame. Though in some embodiments the cover piece may stay connected to the frame even in the collapsed configuration. The cover piece may be attached using buttons or any other suitable hardware in accordance with the CVDs design.

It should be appreciated that these are exemplary steps of assembly; alternate or additional step may be required in accordance with the specific design of the CVD whether the design be one of the exemplary embodiments discussed above, or another embodiment of the CVD.

At step 705 the CVD is installed on the vehicle. Installation comprises connecting a hinge portion of the CVD to a corresponding hinge portion of the vehicle. In some embodiments a hinge pin is used to effectively connect the respective latch portions, though any suitable connection method may be used. Advantageously in some embodiments, the hinge portion of the CVD is functionally equivalent to the hinge portion of the stock vehicle door removed at step 701. Accordingly, no modification to the vehicle is necessary to attach the CVD which can thus be connected to the vehicle in the same way as the stock vehicle door.

Uninstalling the CVD may be done by reversing the steps of installation. The CVD may be collapsed for storage by reversing the assembly steps. Conveniently the CVD may collapse to a state that can easily be stored in the vehicle without inconveniencing passengers. For example, collapsed CVDs may be stored under a seat in the vehicle.

In some embodiments a latch portion of the CVD is engaged with a latch portion of the vehicle as part of installing the CVD on the vehicle. The combination of connecting the hinge portions and engaging the latch portions may secure the cabin of the vehicle against exterior conditions such as inclement weather, perceived wind caused by driving the vehicle at street speeds, and serve to discourage theft from the vehicle cabin.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A collapsible vehicle door for use with a vehicle, the collapsible vehicle door comprising:
    a frame having a plurality of frame pieces, each frame piece having two end portions to connect to and disconnect from adjacent frame pieces among the plurality of frame pieces, the frame being formed by connecting the end portions of each of the plurality of frame pieces with its respective adjacent frame piece;
    a latch secured to one of the plurality of frame pieces;
    a hinge portion secured to one of the plurality of frame pieces; and
    a cover piece having fasteners to secure the cover piece about the frame.

2. The collapsible vehicle door of claim 1, wherein each of the plurality of frame pieces connects to exactly two other frame pieces.

3. The collapsible vehicle door of claim 1, wherein the frame has a single perimeter.

4. The collapsible vehicle door of claim 3, wherein the single perimeter of the frame matches a contour of a door frame of the vehicle.

5. The collapsible vehicle door of claim 3, wherein each of the plurality of frame pieces forms a portion on the single perimeter.

6. The collapsible vehicle door of claim 1, wherein the hinge portion has:
    a securing portion the secures the hinge portion to the frame; and a pin portion connected to the securing portion and configured to attach to a vehicle hinge portion of the vehicle.

7. The collapsible vehicle door of claim 6, wherein the securing portion has a through hole for securing the pin portion, the through hole having a first side and a second side, both sides being configured to interchangeably receive the pin portion.

8. The collapsible vehicle door of claim 7, wherein the pin portion is connected to the securing portion through the first side of the through hole.

9. The collapsible vehicle door of claim 1, wherein the hinge portion comprises a pin configured to be received by a vehicle hinge portion of the vehicle.

10. The collapsible vehicle door of claim 1, wherein the hinge portion comprises a pin configured to be received by a cylindrical receiving portion of the vehicle proximal to the door frame of the vehicle.

11. A method of replacing a stock vehicle door with a collapsible vehicle door on a stock vehicle, the method comprising:
 disconnecting a hinge portion of the stock vehicle door from a hinge portion of the stock vehicle; and
 connecting a hinge portion of the collapsible vehicle door to a hinge portion of the stock vehicle.

12. The method of claim 11, wherein the hinge portion of the collapsible vehicle door comprises a pin and the connecting comprises inserting the pin into the hinge portion of the stock vehicle.

13. The method of claim 11, further comprising assembling the collapsible vehicle door by:
 fixing a plurality of frame pieces together in the form of a frame for the collapsible vehicle door; and
 attaching a cover piece to the frame.

14. The method of claim 13, wherein fixing the plurality of frame pieces comprises inserting a male end of a first frame piece into a female end of a second frame piece and securing the connection with a latching push pin.

15. The method of claim 14, wherein securing the connection is performed with an exterior latching push pin.

16. The method of claim 13, wherein fixing the plurality of frame pieces comprises placing a connecting portion joining adjacent frame pieces into a locked position.

17. A vehicle comprising:
 (A) a vehicle body;
 (B) a vehicle door frame;
 (C) a vehicle hinge portion permanently connected to the vehicle body; and
 (D) a collapsible vehicle door comprising
  (i) a plurality of frame pieces fixed together to form a frame of the collapsible vehicle door;
  (ii) a door hinge portion secured to the frame of the collapsible vehicle door hingedly connected to the vehicle hinge portion; and
  (iii) a cover piece secured about the frame of the collapsible vehicle door.

18. The vehicle of claim 17, wherein the door hinge portion comprises a pin portion which is inserted into a cylindrical portion of the vehicle hinge portion.

19. The vehicle of claim 17, wherein the at least two of the plurality of hinge pieces are fixed together using a pivot piece.

20. The vehicle of claim 17, wherein the door hinge portion has:
 a securing portion the secures the door hinge portion to the frame; and
 a pin portion connected to the securing portion and configured to attach to the vehicle hinge portion of the vehicle, wherein the securing portion has a through hole for securing the pin portion, the through hole having a first side and a second side, both sides being configured to interchangeably receive the pin portion.

* * * * *